United States Patent [19]

Amara et al.

[11] 4,402,753

[45] Sep. 6, 1983

[54] COMPOSITION AND METHOD FOR CURING CONCRETE

[75] Inventors: Louis J. Amara, Hartford; Peitro Paoletti; Benito J. Tavana, both of Wethersfield, all of Conn.

[73] Assignee: Invictus Unlimited, Inc., East Hartford, Conn.

[21] Appl. No.: 288,577

[22] Filed: Jul. 30, 1981

[51] Int. Cl.³ .............................................. C04B 7/354
[52] U.S. Cl. ................................... 106/94; 106/239; 106/314
[58] Field of Search ................. 106/94, 239, 314, 315, 106/116

[56] References Cited

U.S. PATENT DOCUMENTS

| | | | |
|---|---|---|---|
| 2,191,338 | 2/1940 | Clark | 106/239 |
| 2,491,045 | 12/1949 | Holmes | 106/94 |
| 2,671,030 | 3/1954 | Gobel et al. | 106/94 |
| 2,952,062 | 9/1960 | Tillman | 106/239 |
| 3,063,851 | 11/1962 | Madison | 106/94 |
| 3,477,979 | 11/1969 | Hillyer | 106/94 |
| 3,545,991 | 12/1970 | Body | 106/239 |
| 3,900,332 | 8/1975 | Davis | 106/94 |

*Primary Examiner*—James Poer
*Attorney, Agent, or Firm*—Beveridge, DeGrandi & Kline

[57] ABSTRACT

A liquid composition is disclosed which is useful in the fabrication of concrete articles. The composition may be used to coat molds or forms into which freshly mixed concrete is poured, or it may be used as an additive to the concrete. Formed of a petroleum oil fraction; e.g. diesel fuel oil, and a resinous material; e.g. rosin, the mixture is found to result in speeding up of the curing of the freshly poured concrete in addition to several other benefits.

10 Claims, No Drawings

COMPOSITION AND METHOD FOR CURING CONCRETE

Concrete is the most widely used structural and civil engineering material today. Ranging from use in the fabrication of small objects such as concrete block, patio block, fence posts and street light standards to the creation of large constructions such as roadways, bridges, dams, office buildings and institutional buildings, as well as massive off shore oil production platform facilities, concrete has in the last 40 years become an universal material having the most divergent application of any construction material that has even been known.

Raw materials used in making concrete are found in abundance throughout the world and its technology is well suited to capital intensive and highly mechanized technology in the industrial nations as well as to labor intensive and low technology applications in the developing world and less industrialized countries. As is well known, concrete is a conglomerate of strong, but chemically inert, aggregate such as natural sand and stones or artificial mineral materials which is bound together by a matrix of mineral cement. The cement hardens and gains strength over a period of time as a result of chemical reactions with water. Before it hardens, the ingredients for concrete can be mixed into a plastic mass and shaped or molded into virtually any desired configuration.

The history of cement goes back many centuries; the ancient Egyptians used hydrated lime and gypsum cements for pyramid building. The Greeks and Romans developed a mortar for many of their buildings which was made by heating limestone, primarily calcium carbonate, to form lime. The lime was then reacted with water to form slaked lime. However, this mortar tended to crack and crumble when exposed to weather so that the Greeks and Romans gradually developed a stronger cement which was a hydraulic cement; that is, a cement reacted with water, which was called "pozzolana." This was a cement made from finely ground lime, sand and some vulcanic material which was found in particular near the Italian town of Pozzuoli. The Romans found that when water was added to this material it caused it to set into a hardened condition. This type of cement was used in building both the Pantheon and the Colosseum in Rome. The discovery of the Romans remained in use until the late 18th century. Then in 1824 Joseph Aspdin of England obtained a patent for an artificial cement which he called "portland" because the concrete made from it resembled a famous well known building stone used in those days which was obtained from the Isle of Portland near England. The cement made in accordance with the patent of Aspdin became known as "portland" cement to distinguish it from the natural cement or the pozzolana cements.

The composition of portland cement and various other cements as well as its history are matters that are well known in the industry and, for example, is described in *The Chemical Process Industries* by Shreve—1945, McGraw-Hill Book Company, pages 188-200 and *The Illustrated Science and Invention Encyclopedia*, page 636 et seq. H. S. Stuttman Company, Inc., New York, New York.

Cement is a complex combination of four principal constituents which are made in dry form by partial fusion. When water is added to this mixture, it reacts to form an interlocking mass of great strength and hardness. The four main constituents are tricalcium silicate, $3CaO.SiO_2$; tricalcium aluminate, $3CaO.Al_2O_3$, dicalcium silicate $3CaO.SiO_2$ and tetracalcium aluminoferrite, $4CaO.Al_2O_3.Fe_2O_3$. The addition of water to these anhydrous compounds causes chemical reactions to occur. These are matters which are well known in the art and many publications exist describing the chemistry of cement and concrete and the mechanisms and formulations which are typically used in the building industry.

Equally well known in the art is the fact that good curing of the concrete is essential. The strength, durability and appearance of the finished concrete depends on the care that goes into the mixing, placing and subsequent treatment of the mix when it is fresh and still in the plastic condition. The various ingredients must be thoroughly mixed and this is conventionally done with machine mixing. The mixing can be done on the site or in central batching and mixing plants with the fresh concrete taken to the site in revolving drum, ready mixed trucks. For large objects, it is necessary that the concrete be thoroughly compacted to insure complete filling of the forms and to expel all unwanted air from the mix. For thin concrete slabs and smaller objects such as block, the concrete can be compacted by vibrating the entire mold. Equipment and techniques for vibrating concrete are also well known. If desired, the surface of the cast concrete can then be smoothed by an convenient means. If concrete is allowed to dry too fast, it is likely to be ruined and therefore a slow, controlled evaporation of the water is a key part of the curing process. This can be done by sprinkling the newly hardening concrete with water and covering it with plastic sheeting. Also steam curing may be resorted to, as is well known in the industry.

The present invention relates to a liquid composition which can be used in the fabrication of concrete articles; that is to coat the mold or the form into which the freshly mixed concrete is poured. The composition of the invention acts on the fresh concrete mix to convert it into a gel-like consistency, as a result of which the freshly molded concrete article can be moved from the mold much sooner than is the case with conventional practices. Since the mold is emptied sooner by following the teachings of this invention, it is possible to use the mold again more rapidly and recharge it with another batch of concrete to form the next article in the production schedule. The present invention therefore enables a great increase in productivity.

It has been found that the liquid composition of the present invention retains the water in the concrete mixture for a longer period of time than is the case with conventional practices. Therefore, it is not necessary to spray the molded or cast concrete article with water or to treat it with steam in order to bring about the controlled curing of the concrete. The present invention can be used with any conventional batch of concrete mix and can be used with any suitable molding or forming equipment used to make articles of any desired shape, e.g. panels of any desired thickness, fence posts, concrete blocks, patio blocks, wall panels and the numerous other articles that may be conveniently made out of concrete.

The liquid composition of the present invention is typically applied to the forms or molds made of wood, steel, fiber glass or plastic by spraying the mold, brushing the mold, dipping the mold or otherwise applying to the mold surface a sufficient amount of the liquid composition to completely wet the surface of the mold and typically form a layer of liquid on the bottom of the mold. The concrete mixture is then poured into the mold and, typically, the form of mold is vibrated. The composition of the invention impregnates the concrete and acts as a gelling agent to solidify the concrete into a gel or gel-like consistency. At that point, the gelled concrete mass in the shape and configuration conforming to the mold can be removed from the mold very conveniently and without damage or deteriorating the molded article. Because the composition of the invention retards the rotting of wood and retards oxidation of metal, molds made of wood and metal (steel) enjoy a longer production life-time when treated with the composition of this invention.

Because the molded concrete article can be removed from the mold in a shorter period of time than is the case when operating by traditional methods; a concrete panel 2 inches thick and 7 feet long and 2 feet wide can be removed in less than 1 minute; any defects in the finishing of or in the appearance of the molded article, such as cracks, can be corrected quickly before the concrete is set or dry. If it is not possible to correct the defect, the gelled concrete can be immediately returned to the batch and recast as desired. Thus, the invention reduces or eliminates waste "seconds" and discards.

Whereas typically, depending on the size it takes from several hours to several days to dry a molded concrete article in the traditional and usual practice of casting and curing concrete, according to the present invention the molded article can solidify in a far shorter period of time, for example, in a few minutes to several hours, again depending upon the size of the product. Thus, the present invention increases not only the speed and production of freshly molded uncured articles, but it shortens the curing time whereby the product can be placed in use in a far shorter time.

In its action as a curing compound, the composition of the invention acts to increase the productivity by as much as a factor of 10. This is because of the fact that the molded article can be removed from the mold in a relatively short time as compared to the conventional practice. For example, whereas a standard production schedule may involve the formation of 10 units within a given time, the present invention permits a 10 fold increase in production up to 100 units in the same amount of time.

Not only does the present invention permit an increase in speed and productivity, but it has been determined that the strength of the concrete is substantially improved; i.e. on the order of double or triple the strength which is normally obtained. This means that the thickness of a particular structural concrete item may be substantially reduced without sacrificing the strength characteristics.

Concrete articles made in accordance with the present invention such as building panels, building blocks and the like can also be insulated by the incorporation of a conventional insulating material.

Further in accordance with the present invention, it has been found that the liquid composition of this invention can be utilized as an additive to the concrete to result in a water proofing treatment of the concrete, such that for example, a wall formed of the concrete in a thickness of one inch would permit little or no seepage of water.

Therefore, because the composition of the present invention is a water proofing agent and will not permit water to permeate through, concrete compositions made in accordance with this invention are particularly important with regard to the maintenance of roadways. The concrete compositions produced in accordance with the present invention have good bonding capability to existing concrete roadways and therefore can be conveniently used in the resurfacing of the existing roadway surfaces. For this purpose, the liquid composition of the present invention can be mixed directly into the concrete as an additive to obtain all of the desirable attributed previously described.

The common problem encountered with concrete is the appearance of rust stains on the surfaces of a reinforced structure. This is caused by the metal reinforcing elements in the structure which undergo oxidation in the presence of water. The resulting rust permeates through the concrete to exhibit an unsightling discoloration. With the use of the composition of the present invention, rusting is retarded due to a coating which is formed around the steel reinforcing elements when the treated concrete surrounds its surfaces.

The composition of the present invention can also be mixed with a variety of other cement or concrete material such as pumice and slag in order to make a structural concrete block. Dyes, stains, pigments and the like may also be incorporated into the liquid composition of the invention.

In accordance with the present invention, the liquid composition which is utilized for the treatment of molds and casting forms and also for the incorporation into the concrete compositions is formed from a petroleum oil fraction and a derivative of a natural or a synthetic resin.

In more particular detail, the petroleum oil fraction used in accordance with the invention is a heavy oil fraction such as diesel fuel oil. Diesel oil typically has a hydrogen content of 13 and a carbon content of 85 on a gravimetric basis, as fired. The content of $O_2+N_2+S$ is expressed as 2.0. The specific gravity according to the American Petroleum Institute ranges from 22 to 28. See Perry's Handbook of Chemical Engineering, 3rd Edition, page 1654. It has been found that Texaco Diesel Chief oil is particularly suitable for practice of the invention. Generally, any petroleum fraction having these or similar characteristics will be suitable for the purposes of the invention.

As the natural resin component, it is preferred to use rosin. Rosin is also known as colophony and is derived from various species of pine trees, which when tapped yield an oleoresinous product known as crude turpentine. Steam distillation removes the oil of turpentine and leaves the solid rosin. Ranging in color from pale yellow to dark brown, rosin is usually soft, brittle and practically transparent. It has an aromatic odor and is soluble in alcohol, acetic acid and volatile and mixed oils. Typically, the specific gravity ranges from 1.045 to 1.085. The softening point is about 75° C. or 167° F. with a melting point of about 120° to 135° C. With regard to its chemistry, rosin consists almost entirely of abietic acid possibly in the form of isomers thereof. The characteristics and properties of rosins are well known in the art. Rosin is described for example on page 404 of *Handbook of Plastics* by Simonds and Ellis, Van Nostrand Company, New York, New York, 6th Edition, and also in the *Handbook of Chemical Synonmons and Tradenames,* 8th Edition, CRC Press, Cleveland, Ohio, page 195. These references are incorporated herein by reference.

In carrying out the preferred aspects of the invention, a concentrate of the petroleum oil function; i.e. diesel fuel oil, and the resinous material; i.e. rosin, is first prepared. Generally, the solid rosin is first added to the petroleum distillate such as the diesel oil in a container and the container is then heated to a temperature sufficient to melt the rosin in the oil. This may be accomplished by placing the diesel oil in an open glass container and then adding the solid rosin. The glass container is then placed in a water bath and the temperature of the water bath is raised to its boiling point; i.e. 100° C., and the heating is continued until the rosin has dissolved in the oil. It is preferred to agitate or stir the mixture to aid in the dissolution of the rosin temperature. The rosin-oil concentrate may be stored until ready to use or shipped to the ultimate customer for use. When ready for production the producer or manufacturer of the concrete articles then takes the rosin-oil concentrate and dilutes it somewhat by adding it to additional oil to obtain the desired formulation. The composition is then ready for use as the additive or modification agent and can be used to coat the molds or casting forms wherein the freshly poured concrete is then subjected to the action of the composition of the invention.

The chemical changes which take place in the modification of the rosin and the reaction with the concrete are not well understood but the result is a gelling of the concrete which brings about a very rapid gain in the structural strength of the concrete as a result of which it cures more rapidly and is converted into a useable product in a very much shorter period of time than is the case with conventional additives.

The following example is intended to illustrate the invention without limiting it in any fashion.

The following composition is used to make a batch of concentrated mixture consisting of 1 quart of diesel oil and 1 cup (200 grams) of rosin. The rosin used in this example is sold under the brand name, Nancy Gum Rosin, Union Camp, Jacksonville, Florida. The diesel oil is Texaco Diesel Chief brand. 2 cups amounting to approximately 16 ounces of the diesel oil and 1 cup of approximately 200 grams of the rosin are added to a open glass container. The open glass container is then placed in a water bath which is heated to the boiling point of the water. The mixture is heated for about 15 to 25 minutes, stirring with a steel spoon, until the rosin has melted. An additional amount of room temperature diesel oil is then added and with the contents in the glass container to total to 1 measured quart (32 oz.). The glass container and contents are then removed from the water bath and cooled to room temperature. The resulting concentrated rosin-oil mixture may then be stored until ready to use. At that point, the concentrate is then added at a ratio of 4.5 gallons of diesel oil to 1 quart of concentrated rosin-oil mixture for application to the molds or form incorporation into a batch of freshly mixed concrete. This diluted mixture may be stirred or mixed mechanically or agitated to obtain a dispersion of the rosin in the oil. If left to stand, the rosin will precipitate to the bottom. In plant or on-site combining of the concentrate is recommended in order to result in saving bulk shipments of diluted mixture.

This composition so prepared may then be used, illustratively for coating a mold for making $1' \times 1' \times 2''$ patio block into which freshly mixed concrete is poured and vibrated. Sufficient liquid composition is used to wet the surfaces of the mold. After approximately 1 minute, the concrete molded patio block may be removed from the mold whereupon it will be observed that the block is of a gel-like consistency having sufficient strength to support itself. At the end of about 24 hours, the block is fully cured and can be utilized.

It should be understood that various other articles may be cast in a similar fashion. When used as an additive for incorporation into the concrete mix before casting, such as a road surface, the liquid additive of the invention is used in the amount of about 0.1% to 20% by volume, preferably 2–10% by volume, of the concrete.

Concrete does not need to be cast entirely on the construction site. One of the great advantages is that individual beams, planks, blocks or whole wall units can be cast away from the actual site and brought to the construction site as needed. Besides reducing on site work in congested areas, precast construction permits the casting itself, finishing and detailing to be carried out under factory conditions affording standards of quality control that are difficult to achieve at the site. Also, standardized beams and other units can be formed in long life, high precision steel molds for use in a wide variety of structural and architectual applications. Of course, for purposes of the present invention, the mold can be formed of any convenient material and need not be a steel mold.

In general, it has been found that the ratio of oil to solid resin in order to make the initial concentrate should be about $$\frac{16 \text{ fluid ounces}}{200 \text{ gram}}$$

or 0.08 fluid ounces oil to 1 gram of rosin. Then the initial concentrate is diluted up to the volume of about 32 fluid ounces for a final concentrate ratio of about 32 fluid ounces to 200 grams or 0.16 fluid ounces oil to 1 gram rosin. The range of proportions for the final concentrate may be about 0.12–0.2 fluid ounces oil to 1 gram rosin or about 25 to 40 ounces oil to 200 grams rosin.

In the form of application to molds and the like, the concentrate is diluted in additional oil to a suitable concentration of for example, 4.5 gallons oil to 1 quart (32 fluid ounces) of concentrate. This may also vary, for example, from 4 to 5 gallons oil to 1 quart of concentrate. The precise values will vary somewhat depending on the applications and uses of the end product, the composition of the concrete, and the like.

Further modifications and variations will be apparent to those skilled in the art and are intended to be encompassed by the claims which follow.

We claim:

1. A composition for the treatment of freshly mixed concrete comprising a liquid mixture concentrate of a petroleum oil derivative which is diesel oil and a natural rosin dispersed in the petroleum oil derivative, whereby when said composition impregnates the freshly mixed concrete the concrete is rapidly converted to a gel-like consistency which consistency is achieved in much less than if the said composition is not used.

2. The composition of claim 1, wherein the ratio of oil to rosin is about 0.16 fluid ounces of oil to 1 gram of rosin.

3. The composition of claim 1, wherein the ratio of oil to rosin is about 0.12 to 0.2 fluid ounces oil to 1 gram rosin.

4. A composition for the curing of concrete by impregnating the freshly mixed concrete or by admixture with the concrete batch comprising a sufficient amount of diesel oil and rosin dispersed in said oil, whereby the composition enables the concrete to more rapidly attain a gel-like consistency.

5. A composition comprising concrete having incorporated therein a sufficient amount of an additive which is diesel oil and a natural rosin dispersed in said oil to speed up the curing of said concrete.

6. A composition as defined in claim 5, wherein the additive is present in an amount of 0.1% to 20% by volume.

7. A method of improving the curing of concrete comprising providing a mold to contain a cast concrete article, applying to the surfaces of said mold a sufficient amount of a liquid composition, said liquid composition comprising a petroleum oil derivative which is diesel oil and a natural rosin dispersed therein, filling said mold with a fresh concrete mixture, permitting said concrete mixture to remain in said mold for a sufficient period of time for the liquid composition to impregnate the concrete mixture to form a gel-like consistency, thereafter removing the concrete mixture formed thereby and permitting said formed concrete structure to cure.

8. A method of improving the curing of concrete comprising admixing with a fresh batch of concrete a sufficient amount of an additive, wherein said additive is the composition of claim 1.

9. A method of making a curing composition for concrete comprising mixing a petroleum oil derivative which is diesel oil with a natural rosin, subjecting the resulting admixture to elevated temperature for a sufficient period of time to melt said natural rosin and disperse it uniformly in said petroleum oil derivative, cooling said admixture to form said curing composition.

10. The method as defined in claim 9, which further comprises introducing said concentrate into additional diesel oil.

* * * * *